United States Patent [19]
Karlsson
[11] 4,047,872
[45] Sept. 13, 1977

[54] DEVICE ON PRESSING PISTON

[76] Inventor: Hugo Karlsson, Kopmansgatan 17, S-820 60 Delsbo, Sweden

[21] Appl. No.: 556,343

[22] Filed: Mar. 7, 1975

[30] Foreign Application Priority Data

Mar. 8, 1974 Sweden ................................ 7403094

[51] Int. Cl.[2] ................................................ B29C 1/00

[52] U.S. Cl. .................................... 425/469; 425/803; 100/245; 100/DIG. 5

[58] Field of Search ........ 425/801, 802, 398, 803–812, 425/363, 358, 346, 344, 416, 425, 469; 100/245, 295, DIG. 5, 116; 308/3 R; 249/141

[56] References Cited

U.S. PATENT DOCUMENTS

| | | | |
|---|---|---|---|
| 1,312,189 | 8/1919 | Locke | 425/803 |
| 2,783,499 | 3/1957 | Billen | 100/DIG. 5 |
| 2,987,989 | 6/1961 | Freeman | 100/245 X |
| 3,211,193 | 10/1965 | Anderson | 100/245 X |

*Primary Examiner*—Robert L. Spicer, Jr.
*Attorney, Agent, or Firm*—Birch, Stewart, Kolasch and Birch

[57] ABSTRACT

A device for compressing a wax-type material comprising a piston disposed within a chamber wherein channels are provided along the lateral surface of the piston for venting gases during the compressing operation.

2 Claims, 2 Drawing Figures

DEVICE ON PRESSING PISTON

BACKGROUND AND SUMMARY OF THE INVENTION

The present invention relates to a device for venting gases produced by a pressing piston moving in a tubular chamber, and more particularly, to a device for venting gases during the compressing of paraffin powder or candle wax into candles.

In employing the hitherto known apparatus for the production of candles, a problem arises in connection with providing an outlet for the air released from the powder or granules used in candle production when the powder or granules are compressed. Thus far it has sufficed to design the piston so that there is some clearance provided between it and the tubular chamber in which it moves. However, this does not provide satisfactory results as the candle powder is prone to stick to the piston or the inner walls of the tubular chamber thereby reducing play or hampering the movement of the piston. Therefore, the piston and chamber must be cleaned from time to time resulting in additional inconvenience and loss of time. Attempts to channel the air through small holes have not been very successful as the candle wax soon obstructs these holes.

The disadvantages mentioned above have been completely eliminated by means of the device of the present invention, which allows air to pass while the pressing operation is taking place and which in addition has a self-cleaning effect. Accordingly, no extra cleaning is necessary thereby saving time and money. The device of the present invention possesses the characteristics specified in the accompanying claims.

An advantageous embodiment of the present invention is described by way of example with reference to the drawing in which.

Figure 1:
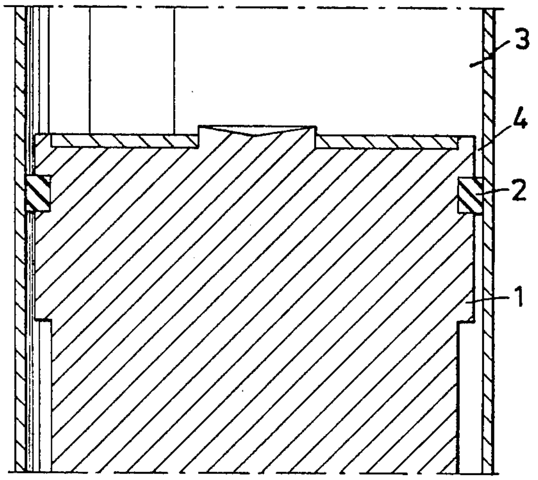
FIG. 1 shows a pressing piston in section with retracted plugs.
Figure 2:
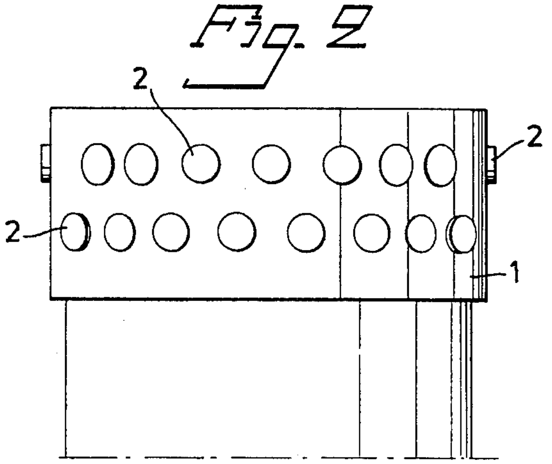
FIG. 2 shows the piston as seen with the surface of the skirt and two rows of plugs disposed thereon.

Referring to the drawing the device consists of a number of plugs 2 made of rubber etc. and fixed on the surface of the skirt of the piston 1, whereby piston 1, plugs 2 and the tubular chamber 3, in which the piston moves, are so arranged that a gap 4 is disposed between the piston 1 and the wall of the chamber 3. During the pressing process the air escaping from the candle wax can pass through this gap. In the illustrated example the plugs 2 are arranged in two parallel rows around the piston 1, whereby the plugs in one row are staggered in relationship to the plugs of another row. Furthermore, the plugs are dimensioned so that the wall surface of the tubular chamber is entirely covered by the motion of the piston.

The invention, of course, is not restricted to the embodiment described, but variations can be made within the scope of the invention as claimed with respect, for example, to the shape and number of projections. Also the plugs can be arranged in many rows and can be made of other material than rubber. Of course the device and pressing piston could be used for pressing granules or powder into substances other than candles. The tubular chamber can be cylindrical or any other shape desired.

I claim:

1. A device for compressing a wax-type material which comprises a chamber containing a piston movably disposed therein, at least a portion of the lateral surface of said piston containing a plurality of projecting members which extend from said lateral surface into sliding engagement with the wall of said chamber, said projecting member defining a plurality of channels therebetween for venting of gases produced during the compressing operation, wherein said piston is provided with a head portion containing a skirt having a continuous surface and said continuous surface of said skirt being provided with said projecting members, and said projecting members are arranged in a plurality of substantially parallel rows, with the projecting members in adjacent rows being staggered with respect to each other.

2. The device of claim 1, wherein said projecting members are rubber plugs.

* * * * *